(12) United States Patent
Sugiyama et al.

(10) Patent No.: US 11,283,120 B2
(45) Date of Patent: Mar. 22, 2022

(54) BATTERY PACK

(71) Applicant: MURATA MANUFACTURING CO., LTD., Kyoto (JP)

(72) Inventors: Masaaki Sugiyama, Kyoto (JP); Tsuyoshi Nakamura, Kyoto (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 158 days.

(21) Appl. No.: 16/012,230

(22) Filed: Jun. 19, 2018

(65) Prior Publication Data
US 2018/0301773 A1 Oct. 18, 2018

Related U.S. Application Data

(63) Continuation of application No. PCT/JP2016/085151, filed on Nov. 28, 2016.

(30) Foreign Application Priority Data

Jan. 15, 2016 (JP) .............................. JP2016-006085

(51) Int. Cl.
*H01M 10/6551* (2014.01)
*H01M 10/613* (2014.01)
(Continued)

(52) U.S. Cl.
CPC ..... *H01M 10/6551* (2015.04); *H01M 10/613* (2015.04); *H01M 10/625* (2015.04);
(Continued)

(58) Field of Classification Search
CPC ........... H01M 10/613; H01M 10/6235; H01M 10/625; H01M 10/643; H01M 10/653;
(Continued)

(56) References Cited

U.S. PATENT DOCUMENTS 6,130,003 A 10/2000 Etoh et al.
6,225,788 B1 5/2001 Kouzu et al.
(Continued)

FOREIGN PATENT DOCUMENTS

JP H11-111349 A 4/1999
JP H11-273643 A 10/1999
(Continued)

OTHER PUBLICATIONS

International Search Report and Written Opinion issued in connection with International Patent Application No. PCT/JP2016/085151, dated Jan. 17, 2017. (9 pages).
(Continued)

*Primary Examiner* — Sarah A. Slifka
*Assistant Examiner* — Rachel L Zhang
(74) *Attorney, Agent, or Firm* — K&L Gates LLP

(57) ABSTRACT

A battery pack having a heat-radiating structure and a vibration-proof structure is provided. The battery pack includes: a battery block including a plurality of batteries and a battery holder; an exterior case configured to house the battery block; a heat conductive member interposed between a first inner surface of the exterior case and at least one of electrodes of the batteries; and a vibration-proof member interposed between a second inner surface of the exterior case and the battery holder. The vibration-proof member is thicker than the heat conductive member.

13 Claims, 10 Drawing Sheets

(51) Int. Cl.

| | |
|---|---|
| *H01M 10/6235* | (2014.01) |
| *H01M 10/625* | (2014.01) |
| *H01M 10/643* | (2014.01) |
| *H01M 10/653* | (2014.01) |
| *H01M 2/10* | (2006.01) |
| *H01M 2/20* | (2006.01) |
| *H01M 10/6554* | (2014.01) |
| *H01M 50/20* | (2021.01) |
| *H01M 50/502* | (2021.01) |
| *F16F 15/04* | (2006.01) |

(52) U.S. Cl.
CPC ..... *H01M 10/6235* (2015.04); *H01M 10/643* (2015.04); *H01M 10/653* (2015.04); *H01M 10/6554* (2015.04); *H01M 50/20* (2021.01); *H01M 50/502* (2021.01); *F16F 15/04* (2013.01)

(58) Field of Classification Search
CPC ......... H01M 10/6551; H01M 10/6554; H01M 2/1022; H01M 2/1077; H01M 2/204; H01M 2/206
See application file for complete search history.

(56) References Cited

U.S. PATENT DOCUMENTS

| | | | | |
|---|---|---|---|---|
| 8,278,877 | B2* | 10/2012 | Murayama | H01M 2/1022 320/112 |
| 2001/0010878 | A1 | 8/2001 | Ninomiya et al. | |
| 2011/0039152 | A1* | 2/2011 | Kim | H01M 2/1094 429/178 |
| 2012/0082887 | A1 | 4/2012 | Nakanishi et al. | |
| 2012/0301765 | A1* | 11/2012 | Loo | H01M 2/1083 429/100 |
| 2013/0017422 | A1* | 1/2013 | Bae | H01M 2/1077 429/82 |
| 2015/0037647 | A1* | 2/2015 | Nguyen | H01M 10/625 429/120 |
| 2015/0075923 | A1* | 3/2015 | Jang | H02K 7/116 188/162 |
| 2015/0222131 | A1* | 8/2015 | Kano | H02J 7/0013 320/112 |
| 2016/0172640 | A1* | 6/2016 | Kadowaki | H01M 50/202 429/100 |

FOREIGN PATENT DOCUMENTS

| | | |
|---|---|---|
| JP | 2000-223160 A | 8/2000 |
| JP | 2002-157984 A | 5/2002 |
| JP | 2005-332829 A | 12/2005 |
| JP | 2011-009477 A | 1/2011 |
| JP | 2015-053276 A | 3/2015 |

OTHER PUBLICATIONS

Chinese Office Action dated Jun. 11, 2020 in Chinese Application No. 201680079007.4.

* cited by examiner

BATTERY PACK

CROSS REFERENCE TO RELATED APPLICATIONS

The present application is a continuation of PCT patent application no. PCT/JP2016/085151, filed on Nov. 28, 2016, which claims priority to Japanese patent application no. JP2016-006085 filed on Jan. 15, 2016, the entire contents of which are being incorporated herein by reference.

BACKGROUND

The present technology generally relates to a battery pack applicable to an electronic apparatus, an electric vehicle, an electric tool, and the like and including a battery pack having a heat-radiating structure and a vibration-proof structure.

The battery pack includes one or more battery blocks each including a battery holder in which a plurality of batteries such as lithium-ion batteries is held, the one or more battery blocks being housed in an exterior case. This battery pack is used in a personal computer, an electronic apparatus such as a portable communication terminal, a vehicle mounting an electric motor as a driving source, and an electric machine such as a rammer and a lawn mower.

For example, a battery pack cooling device is configured as follows: the electrical storage unit includes at least one secondary battery, and an inflow port and an outflow port for a refrigerant for cooling the secondary battery, while being fixed to a vehicle across the support part, the support part is capable of containing the refrigerant therein, and expands or contracts in accordance with variation in distance between the electrical storage unit and the vehicle, while including a refrigerant inlet port provided with a check valve, and a refrigerant outlet port provided with a check valve, the support part is configured such that the refrigerant flows into the support part through the refrigerant inlet port when the support part expands and the refrigerant flows out of the support part through the refrigerant outlet port when the support part contracts, and the inflow port communicates with the refrigerant outlet port, or the outflow port communicates with the refrigerant inlet port.

SUMMARY

The present technology generally relates to a battery pack applicable to an electronic apparatus, an electric vehicle, an electric tool, and the like including a battery pack having a heat-radiating structure and a vibration-proof structure.

When the battery pack is used, the housed batteries generate heat. This heat generation of the batteries may cause deterioration in performance of the batteries. When the battery pack is used in a vehicle, vibration of a driving source such as an engine is transmitted to the battery pack, and then this vibration may cause deterioration in performance of the batteries.

One of the main aspects of the present technology is to provide a battery pack having a heat-radiating structure and a vibration-proof structure according to an embodiment.

According to an embodiment of the present technology, a battery pack is provided. The battery pack includes a battery block including a plurality of batteries and a battery holder; an exterior case configured to house the battery block; a heat conductive member interposed between a first inner surface of the exterior case and at least one of electrodes of the batteries; and a vibration-proof member interposed between a second inner surface of the exterior case and the battery holder, and the vibration-proof member is thicker than the heat conductive member.

In the battery pack according to an embodiment of the present technology, the exterior case may include a first wall facing the vibration-proof member, a second wall facing the heat conductive member, and a stepped portion connecting the first wall and the second wall.

The battery pack according to an embodiment of the present technology may be configured such that the vibration-proof member is provided in a housing space defined by the stepped portion.

The battery pack according to an embodiment of the present technology may also include a heat-radiating portion in the second wall.

In addition, the battery pack according to an embodiment of the present technology may further include a first waterproof member configured to cover at least an electrode of the batteries.

In the battery pack according to an embodiment of the present technology, the vibration-proof member may include a rubber vibration insulator. In this battery pack, the vibration-proof member may include an ethylene propylene diene rubber.

In the battery pack according to an embodiment of the present technology, the heat conductive member may include an inorganic-filler-containing silicon resin.

In the battery pack according to an embodiment of the present technology, the heat-radiating portion may include a radiating fin provided on an outer surface of the second wall, and the radiating fin includes a projecting shape.

In the battery pack according to an embodiment of the present technology, a leading end face of the first wall and a leading end face of the radiating fin may be disposed in a same plane.

The battery pack according to an embodiment of the present technology may be configured such that electrode tabs of the batteries are connected to each other, the heat conductive member is interposed between the electrode tabs and the second wall, and at least an electrode of the batteries, the electrode tabs, the heat conductive member, and the second wall are in contact with each other.

In the battery pack according to an embodiment of the present technology, the exterior case may include a pair of half-exterior cases, and the pair of half-exterior cases may be joined to each other with a second waterproof member interposed between the half-exterior cases.

In the battery pack according to the present technology, the vibration-proof member may include a head part and a shaft part extending from the head part.

According to an embodiment of the present technology, since the battery pack has the heat-radiating structure and the vibration-proof structure, it is possible to prevent deterioration in performance of each of the batteries due to heat generation of each of the batteries and vibration transmitted to each of the batteries from the driving source.

Additional features and advantages are described herein, and will be apparent from the following Detailed Description and the figures.

DETAILED DESCRIPTION

Figure 1:
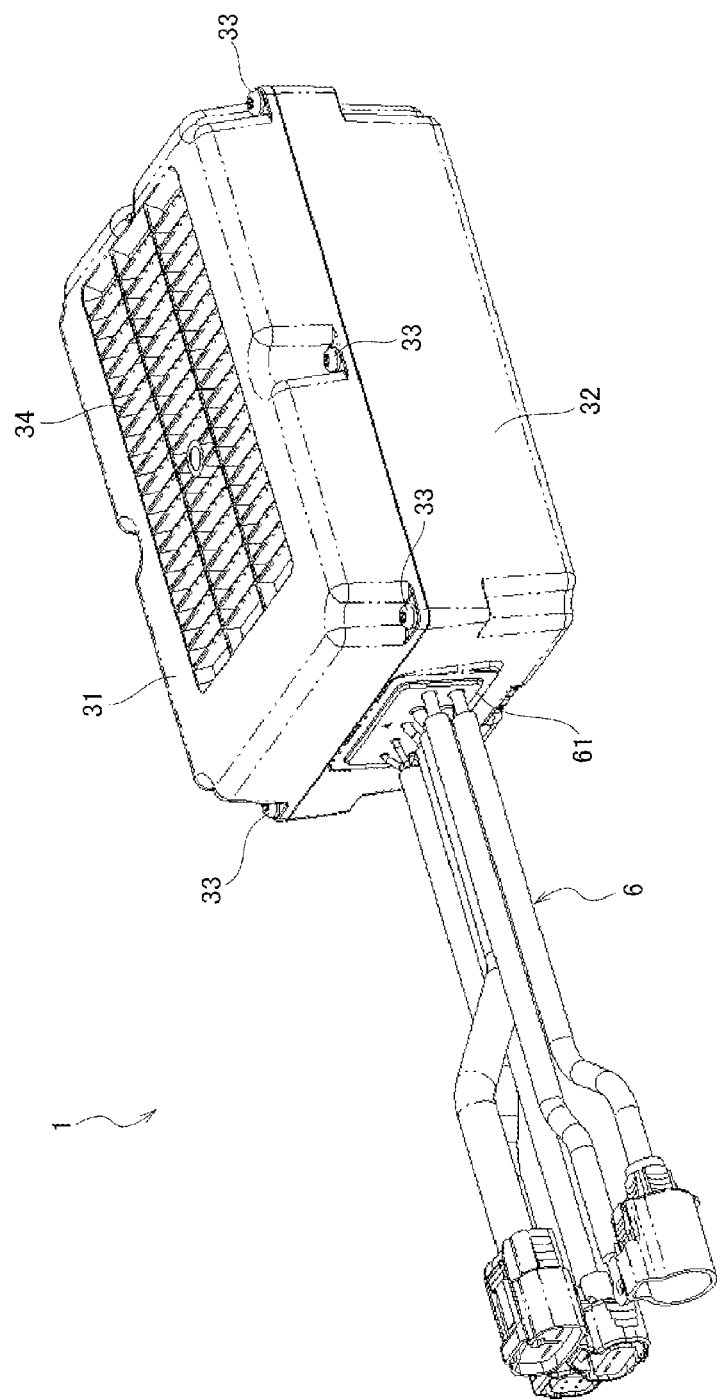
FIG. 1 is a perspective view of a battery pack according to an embodiment of the present technology.

The present technology generally relates to a battery pack applicable to an electronic apparatus, an electric vehicle, an electric tool, and the like and including a battery pack having a heat-radiating structure and a vibration-proof structure. As described herein, the present disclosure will be described based on examples with reference to the drawings, but the present disclosure is not to be considered limited to the examples, and various numerical values and materials in the examples are considered by way of example.

With reference to FIGS. 1 to 5, a battery pack 1 according to an embodiment of the present technology will be described. The battery pack 1 broadly includes a battery block 2 serving as a power source, and an exterior case 3 housing the battery block 2. The exterior case 3 is provided, in its inside, with a heat conductive member 4 for releasing heat generated from the battery block 2 to the outside, and a vibration-proof member 5 contributing to vibration isolation of the battery block 2. Structure of each component will be described below.

The battery block 2 includes batteries 21 and a battery holder 22 holding the batteries 21. In the battery pack 1 according to the embodiment, seven batteries 21 are arranged in each of four rows in the battery holder 22 to constitute a battery group.

Figure 2:
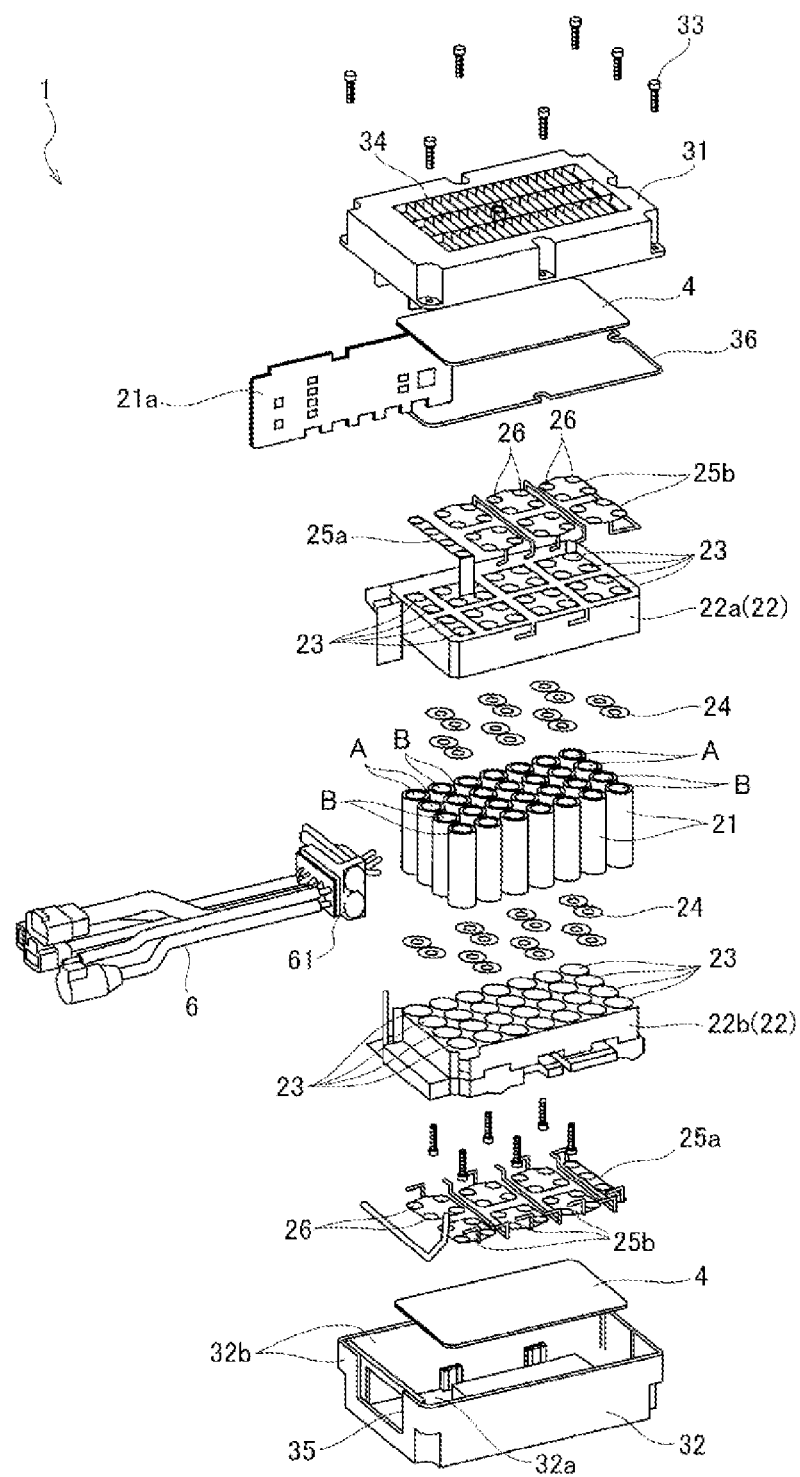
FIG. 2 is an exploded perspective view of the battery pack illustrated in FIG. 1.

Specifically, as illustrated in FIG. 2, the batteries 21 adjacent to each other in the longitudinal direction of the battery block 2 are arranged such that an electrode A of one of the batteries 21 and an electrode B of the other thereof each face a same direction in the battery group. Meanwhile, when one battery group includes two batteries 21 arranged so as to have the electrodes A and B aligned in the same direction, two battery groups adjacent to each other in the width direction of the battery block 2 are arranged such that the electrodes A and B of each of the two battery groups are arranged in different directions. In the battery pack according to the present technology, the array direction of the batteries illustrated in FIG. 2 is only an example, and thus an array direction used in a conventional battery block may be used according to other embodiments of the present technology.

Each of the batteries 21 according to the present technology is not particularly limited, and any suitable type of battery can be used. For example, the battery includes a primary battery such as a manganese dry battery, an alkali manganese dry battery, and a lithium primary battery, and a secondary battery such as a nickel-cadmium battery, a nickel-metal hydride battery, a nickel-zinc battery, a lead-acid battery, a lithium secondary battery, a lithium ion secondary battery, and a lithium ion polymer secondary battery. It is preferable that the battery pack according to the present technology uses a lithium ion secondary battery (e.g., model number US18650 series) according to an embodiment.

In the battery pack 1 illustrated in FIG. 1, a lithium ion secondary battery having high energy density is used as each of the batteries 21. This causes a protection circuit 21a (PCM) to be housed in the exterior case 3 to secure safety. In the battery pack according to the present technology, a configuration of the battery pack, such as the number of the batteries 21 and a connection form, can be appropriately changed depending on application of the battery pack.

In the battery pack 1 illustrated in FIG. 1, the battery holder 22 includes a pair of half-cases 22a and 22b. The pair of half-cases 22a and 22b are substantially identical to each other, and formed in a substantially rectangular shape.

The material of each of the half-cases 22a and 22b is not particularly limited, and includes an insulating material such as plastic, for example Each of the half-cases 22a and 22b may be made of a material containing metal powder or carbon, with high heat conductivity. Using this kind of material enables heat generated from each of the batteries 21 to be efficiently released to the outside. Alternatively, each of the half-cases 22a and 22b may be made of a material containing glass fiber or carbon filler. In this case, mechanical strength of each of the half-cases 22a and 22b can be increased.

Each of the half-cases 22a and 22b is provided with a battery housing portion 23 in which each of the batteries 21 is housed. As described above, twenty-eight batteries 21 are held in the battery holder 22, so that each of the half-cases 22a and 22b is provided with twenty-eight battery housing portions 23.

Each of the battery housing portions 23 is formed in a hollow cylindrical shape along a direction perpendicular to the longitudinal direction of the battery pack 1, for example, and has one end provided with an opening for allowing one of the batteries 21 to be inserted therethrough. Meanwhile, each of the battery housing portions 23 has the other end provided with an opening in a substantially circular shape, for example, to allow an electrode of each of the batteries 21 to be exposed from the battery holder 22 when each of the batteries 21 is inserted.

When the half-case 22a and the half-case 22b are assembled, the openings of the respective battery housing portions 23 of each of the half-cases 22a and 22b are connected to each other to form spaces in each of which one of the batteries 21 is to be housed.

The battery housing portions 23 are provided at predetermined intervals in each of the half-cases 22a and 22b, so that the batteries 21 can be insulated from each other.

Figure 3:
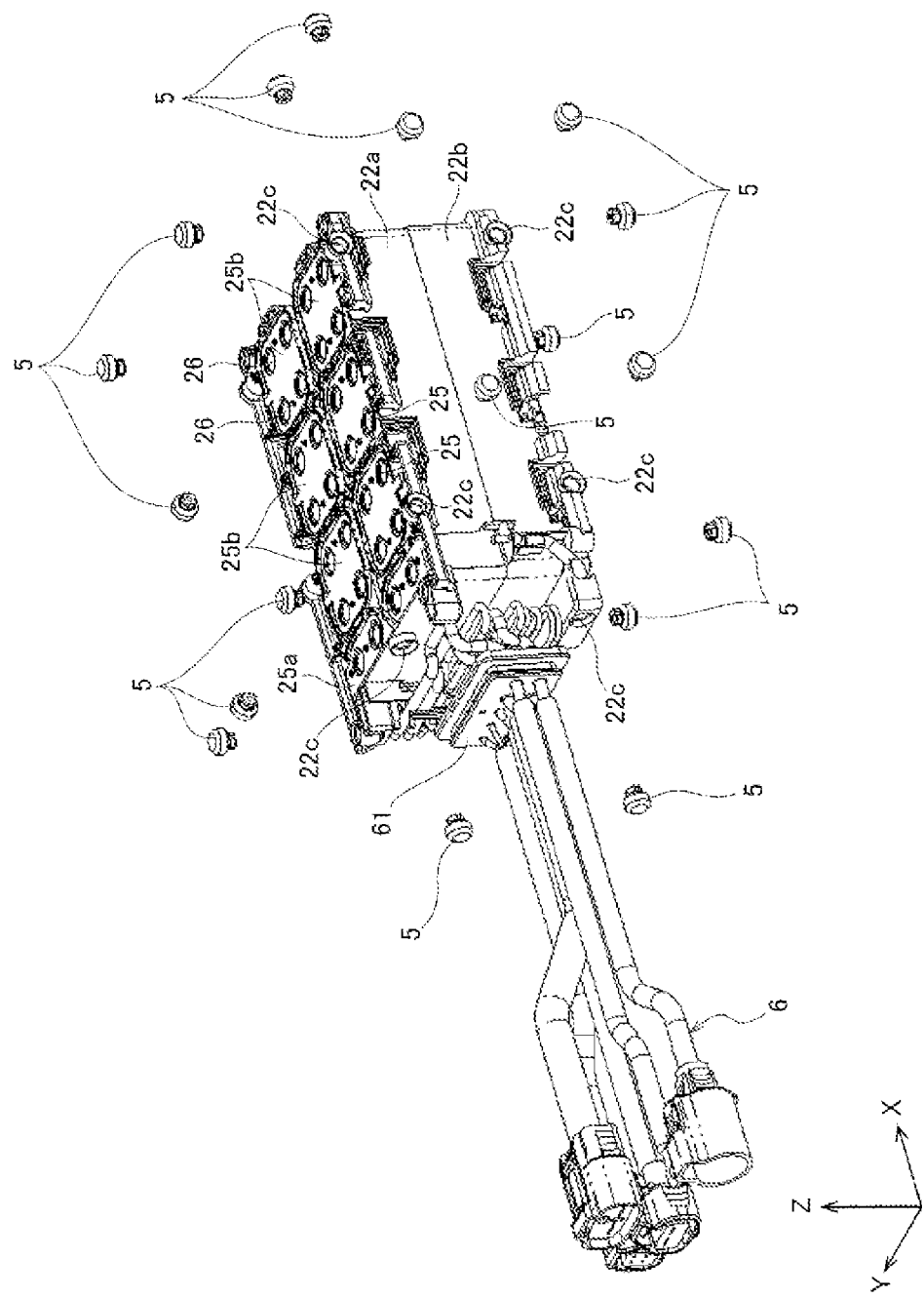
FIG. 3 is an exploded perspective view illustrating a battery block and a harness provided in the battery pack illustrated in FIG. 1.

Each of the half-cases 22a and 22b is provided with a plurality of insertion holes 22c into each of which the vibration-proof member 5 is fitted (refer to FIG. 3).

In the battery pack 1, one insertion hole 22c is provided in each of end faces of the corresponding half-cases 22a and 22b in its longitudinal direction (the arrow X direction), two insertion holes 22c are provided in each of end faces of the corresponding half-cases 22a and 22b in its width direction (the arrow Y direction), and four insertion holes 22c are provided in each of end faces of the corresponding half-cases 22a and 22b in a direction (the arrow Z direction) perpendicular to the longitudinal direction (refer to FIG. 3). That is, a total of twenty insertion holes 22c are provided in the battery pack 1.

In the battery pack 1 according to the present technology, the number of the insertion holes 22c is not particularly limited, and may be appropriately changed in accordance with the number of the vibration-proof members 5 required for vibration isolation of the battery block 2.

In the battery pack 1, rubber rings 24 are each provided as a first waterproof member between the electrode A of each of the batteries 21 and an inner surface of the corresponding one of the battery housing portions 23, facing the electrode A. The rubber rings 24 are each formed in a disk-like shape provided with a substantially circular hole, for example. The rubber ring 24 has an outer diameter being set substantially equal to or less than an outer diameter of each of the batteries 21, and is disposed so as to cover the electrode A. Meanwhile, each of the rubber rings 24 is provided with a hole, so that the electrode of each of the batteries 21 is exposed to the outside of the battery holder 22 through the hole of the corresponding one of the rubber rings 24 when each of the batteries 21 is inserted into the corresponding one of the battery housing portions 23.

The rubber ring 24 may be configured to have elasticity to be able to deform in accordance with pressure from the outside. Thus, the rubber ring 24 may include a rubber material such as natural rubber, synthetic natural rubber, silicon, isoprene rubber, butadiene rubber, styrene rubber, styrene butadiene rubber, butyl rubber, ethylene-propylene rubber, nitrile rubber, chlorosulfonated polyethylene rubber, acrylic rubber, urethane rubber, silicone rubber, fluorocarbon rubber, or polysulfide rubber.

When the rubber ring 24 is made of the rubber material containing inorganic filler, a waterproof effect thereof can be further increased. This kind of inorganic filler includes silica, alumina, calcium carbonate, titanium oxide, mica, zeolite, active carbon, and the like.

When heat conductive resin such as epoxy resin, phenolic resin, or silicon resin is used as a material of the rubber ring 24, heat generated from the batteries 21 can be more efficiently released to the outside together with the heat conductive member 4.

In the battery pack according to the present technology, while the rubber ring 24 as a waterproof member is provided between the electrode A of each of the batteries 21 and the corresponding one of the half-cases 22a and 22b, the rubber ring 24 may be provided between at least one of electrodes of each of the batteries 21 and at least any one of the half-cases 22a and 22b. For example, each of the rubber rings 24 may be provided between the other electrode B of the corresponding one of the batteries 21 and the corresponding one of the half-cases 22a and 22b, or may be provided between both the electrodes A and B of the corresponding one of the batteries 21 and the corresponding one of the half-cases 22a and 22b.

To reliably prevent water from entering the inside of the battery holder 22, it is preferable that each of the rubber rings 24 is provided between both the electrodes A and B of each of the batteries 21 and the corresponding one of the half-cases 22a and 22b.

In the battery holder 22, metal plates 25 each as an electrode tab for electrically connecting each of the batteries 21 are assembled, and the metal plates 25 are disposed so as to cover both the corresponding electrodes A and B provided in each of the batteries 21. Each of the metal plates 25 is provided with electrode joint portions 26, and the electrode of each of the batteries 21, exposed to the outside of the battery holder 22 through the hole of the corresponding one of the rubber rings 24, is in close contact with the corresponding one of the electrode joint portions 26.

The material of each of the metal plates 25 is not particularly limited, and examples thereof include a copper alloy, nickel, a nickel alloy, and the like. Using a copper alloy as a material of the metal plate 25 enables electricity to be supplied with low resistance. Using nickel or a nickel alloy as a material of the metal plate 25 enables oxidation of a surface of the metal plate 25 to be prevented as much as possible, as well as welding to the electrode of each of the batteries 21 to be improved.

The battery pack 1 illustrated in FIG. 1 includes first metal plates 25a and second metal plates 25b. Each of the first metal plates 25a is provided with two electrode joint portions 26 to electrically connect a set of two batteries 21. Meanwhile, each of the second metal plates 25b is provided with four electrode joint portions 26 to electrically connect a set of four batteries 21.

As illustrated in FIG. 2, two first metal plates 25a are assembled in the half-case 22a so that each of the two first metal plates 25a electrically connects a set of two batteries 21 adjacent to each other in the width direction of the half-case 22a among four batteries 21 adjacent to harness 6 for deriving electric power, and each of the second metal plates 25b electrically connects another four batteries 21.

Then, two first metal plates 25a are assembled also in the half-case 22b so that each of the two first metal plates 25a electrically connects a set of two batteries 21 adjacent to each other in the width direction of the half-case 22a among four batteries 21 most distant from the harness 6. Each of the second metal plates 25b electrically connects another four batteries 21.

The structure of each of the metal plates 25a and 25b is not limited in the battery pack 1 according to the present technology as long as the metal plates 25a and 25b each are capable of electrically connecting the batteries 21. For example, a single metal plate 25 provided with twenty-eight electrode joint portions 26 may be formed without being separated into the first metal plate 25a and the second metal plate 25b so that the single metal plate 25 electrically connects all of twenty-eight batteries 21.

Next, the heat conductive member 4 provided in the battery pack 1 according to the present technology will be described. As illustrated in FIG. 2, the heat conductive member 4 is disposed between the battery block 2 and the exterior case 3.

Specifically, the heat conductive member 4 is disposed between the metal plates 25a and 25b covering the corresponding electrodes of the respective batteries 21, and the inner surface of the exterior case 3 facing the respective metal plates 25a and 25b, and two heat conductive members 4 are provided in the battery pack 1 as a whole.

Each of the heat conductive members 4 has an outer surface in close contact with the inner surface of the exterior case 3, and has an inner surface in close contact with the metal plates 25a and 25b. Thus, no air layer is provided among the exterior case 3, each of the heat conductive members 4, and the metal plates 25a and 25b.

Each of the heat conductive members 4 is formed in a substantially plate-like shape with a size covering all of the metal plates 25a and 25b assembled in the battery holder 22. The heat conductive member 4 has a thickness being set within a range of 0.1 to 4.0 mm, preferably within a range of 0.1 to 2.0 mm, and more preferably within a range of 0.1 to 1.0 mm. Setting a thickness of the heat conductive member 4 within the range enables heat generated from each of the batteries 21 to be efficiently released to the outside.

The battery pack 1 including the heat conductive member 4 as described above enables heat generated from each of the batteries 21 to be appropriately transmitted to the exterior case 3 even when each of the batteries 21 generates heat due to use of the battery pack 1.

Each of the heat conductive members 4 may be made of any material as long as heat generated from each of the batteries 21 can be appropriately transmitted to the exterior case 3, and it is preferable to use a composite material composed of an inorganic filler and a heat conductive resin, for example Examples of the inorganic filler include at least one or more kinds selected from a group consisting of alumina, oxidation magnesium, boron nitride, silicon oxide, silicon carbide, silicon nitride, and aluminium nitride. Examples of the heat conductive resin include at least one or more kinds selected from epoxy resin, phenolic resin, and silicon resin.

The battery pack 1 according to the present technology includes the vibration-proof member 5 that prevents vibration from being transmitted to the battery block 2, particularly to the batteries 21.

Figure 4:
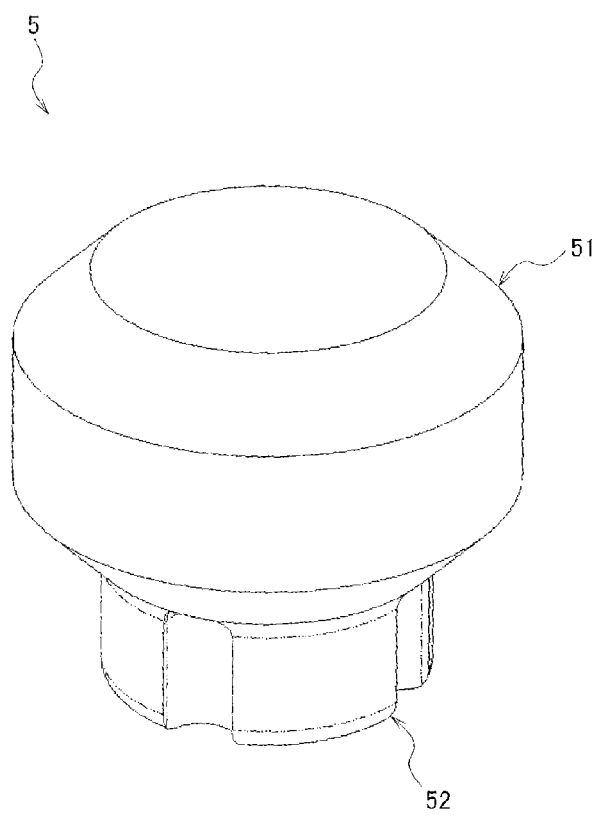
FIG. 4 is a perspective view of a vibration-proof member provided in the battery pack illustrated in FIG. 1.

As illustrated in FIG. 4, the vibration-proof member 5 includes a head part 51 formed in a substantially top-like shape, and a shaft part 52 extending from the head part 51.

The head part 51 has an outer diameter being set larger than an outer diameter of the shaft part 52. The shaft part 52 is formed in the shape of a substantially cylindrical column, and is inserted into an insertion hole 22c formed in each of the half-cases 22a and 22b of the battery holder 22. The shaft part 52 has an outer diameter substantially equal to or slightly more than an inner diameter of the insertion hole 22c.

When the shaft part 52 is inserted into the insertion hole 22c, the vibration-proof member 5 is positioned with respect to the half-cases 22a and 22b, and the head part 51 projects from an outer surface of the corresponding one of the half-cases 22a and 22b.

Figure 5:
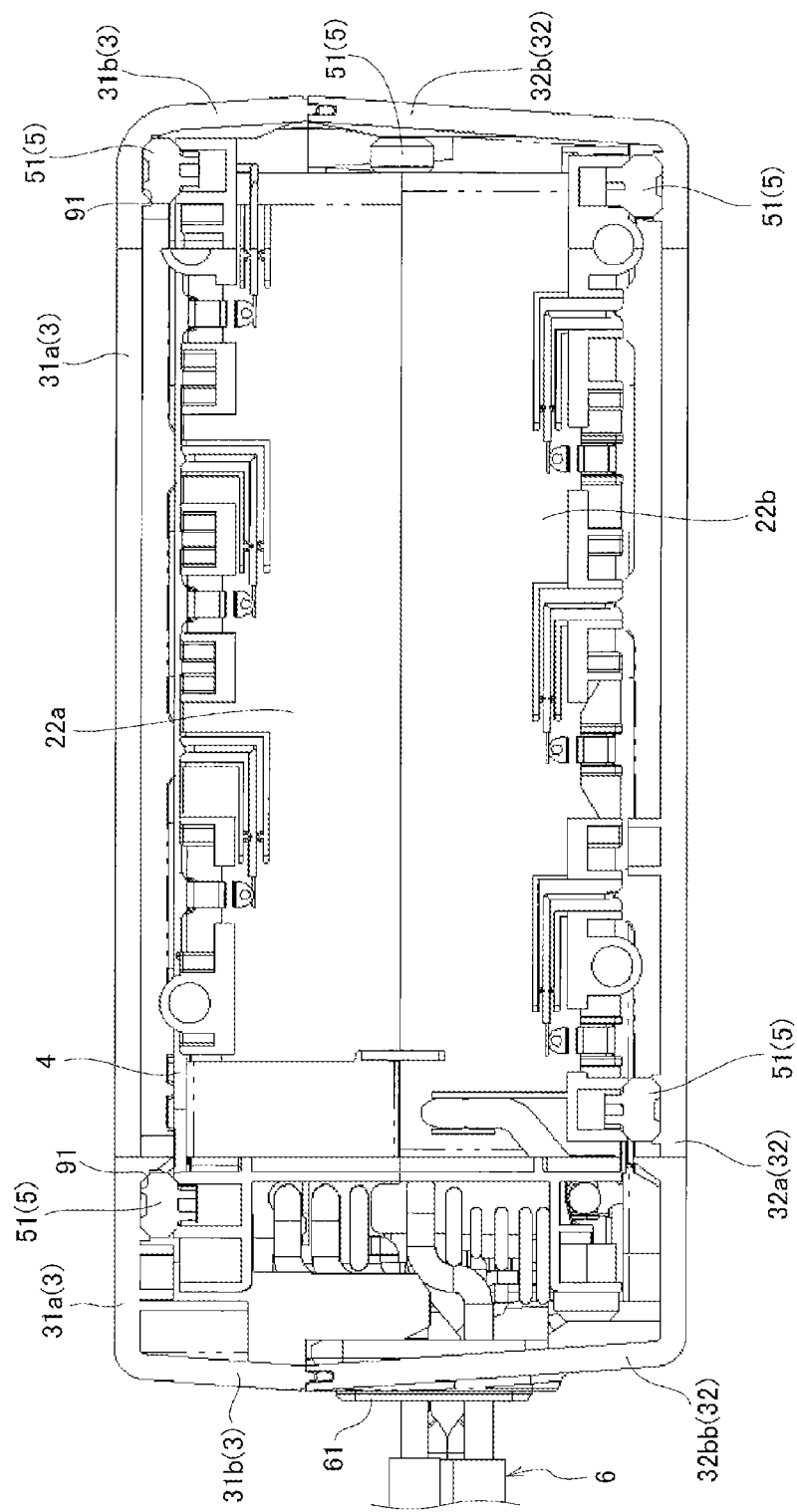
FIG. 5 is a partly-sectioned view of the battery pack illustrated in FIG. 1.

When the vibration-proof member 5 is attached to each of the half-cases 22a and 22b, a bottom surface of the head part 51 is brought into close contact with an outer surface of each of the half-cases 22a and 22b as illustrated in FIG. 5. When the vibration-proof member 5 is attached to the battery holder 22, the head part 51 projects from the outer surface of each of the half-cases 22a and 22b. This causes a top surface of the head part 51 to be brought into pressure contact with the inner surface of the exterior case 3, facing each of the half-cases 22a and 22b. That is, the vibration-proof member 5 is interposed between the inner surface of the exterior case 3 and the battery holder 22.

In the vibration-proof member 5 as described above, the head part 51 has a thickness (a length from the bottom surface in contact with the outer surface of each of the half-cases 22a and 22b to the top surface in contact with the inner surface of the exterior case 3) that is appropriately set depending on installation weight of the vibration-proof member 5, the number of weight supporting points, and a range of regions where the vibration-proof member 5 can isolate vibration of the battery block 2 (hereinafter referred to as a "range of target vibration isolation regions"). For example, the thickness is set within a range of 3.0 to 10.0 mm, preferably within a range of 4.0 to 7.0 mm, and more preferably within a range of 5.0 to 6.0 mm Thus, the head part 51 of the vibration-proof member 5 has a thickness that is set larger than a thickness of the heat conductive member 4.

The vibration-proof member 5 as described above may be made of elastic material as long as it has and is able to deform in accordance with pressure from the outside, and it is preferable to use rubber excellent in vibration-proof properties. Examples of the rubber include diene rubber such as natural rubber (NR), epoxynized natural rubber (ENR), polyisoprene rubber (IR), polybutadiene rubber (BR), styrene-butadiene rubber (SBR), styrene-isoprene rubber, butadiene-isoprene rubber, styrene-butadiene-isoprene rubber, chloroprene rubber (CR), acrylonitrile-butadiene rubber (NBR), or ethylene propylene diene rubber (EPDM). Each of these kinds of rubber may be used alone, or two or more kinds of rubber may be blended to be used. Among others, it is preferable to use ethylene propylene diene rubber (EPDM), excellent in vibration-proof properties, as a material of the vibration-proof member according to the present technology.

Depending on use environment of the battery pack 1, vibration may act on the battery block 2 from any direction, such as the longitudinal direction (the X direction in FIG. 3), the width direction (the Y direction in FIG. 3), and the direction perpendicular to the longitudinal direction (the Z direction in FIG. 3) of the battery pack 1.

Thus, the battery pack 1 illustrated in FIG. 1 is configured such that each of the vibration-proof members 5 is attached to the battery holder 22 from the corresponding one of the longitudinal direction, the width direction, and the direction perpendicular to the longitudinal direction of the battery pack 1.

Specifically, two vibration-proof members 5 are inserted into the corresponding two insertion holes 22c, from the longitudinal direction, formed in each of opposite end faces of the battery holder 22 in the longitudinal direction. In addition, four vibration-proof members 5 are inserted into the corresponding four insertion holes 22c, from the width direction, formed in each of opposite end faces of the battery holder 22 in the width direction. FIG. 2 is a perspective view, so that the insertion hole 22c formed in the end face in the width direction, on a back side in the plane of drawing, and some of the vibration-proof members 5 are omitted. In addition, four vibration-proof members 5 are inserted into the corresponding four insertion holes 22c, from the direction perpendicular to the longitudinal direction, formed in each of opposite end faces of the battery holder 22 in the direction perpendicular to the longitudinal direction.

While the battery pack 1 according to the present technology is configured such that a total of twenty vibration-proof members 5 are attached to the battery block 2, the number of the vibration-proof members 5 is not particularly limited. Any number thereof is available as long as vibration can be prevented from being transmitted to the battery block 2.

A shape of the vibration-proof member 5 is not particularly limited, and can be appropriately changed in accordance with a load applied to the battery pack 1, the amount of vibration, and a size of a placement space of the vibration-proof member, based on a size of the battery pack. Then, the range of target vibration isolation regions can be adjusted by changing installation weight of the vibration-proof member 5, the number of weight supporting points, and the like. Modifications of the vibration-proof member 5 include those illustrated FIGS. 6 to 10. While the modifications illustrated in FIGS. 6 to 10 are each different from the vibration-proof member 5 illustrated in FIG. 4 in shape of the head part 51, the shaft part 52 of each of them is the same in shape as the shaft part 52 of the vibration-proof member 5 illustrated in FIG. 4. The difference in shape of the head part 51 will be described below. The shape of the shaft part 52 is not limited to the shape illustrated in FIG. 4, and may be appropriately changed to the following shapes: a shape facilitating insertion of the head part 51 into each of the half-cases 22a and 22b; and a shape capable of reliably achieving positioning of the head part 51 with respect to the half-cases 22a and 22b (e.g., a shape of the shaft part 52 provided, on its outer peripheral surface, with a protrusion), for example.

Figure 6:
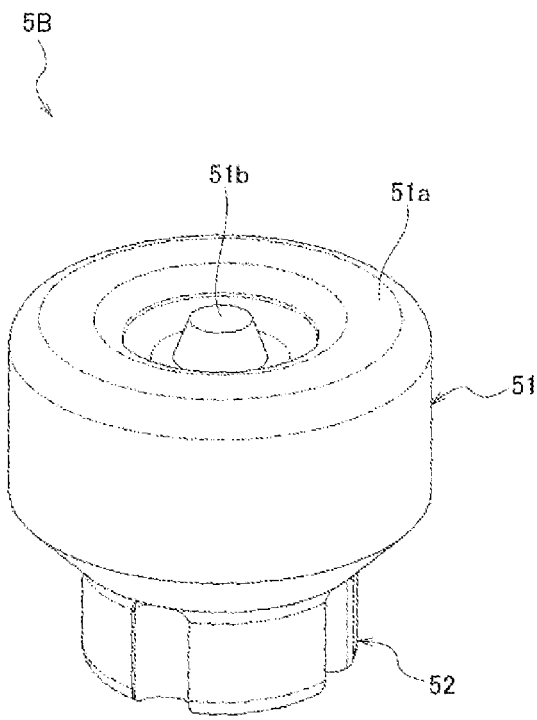
FIG. 6 is a perspective view illustrating a modification of the vibration-proof member provided in the battery pack according to another embodiment of the present technology.

In a modification illustrated in FIG. 6, the head part 51 includes an outer edge portion 51a, a protrusion 51b provided at the center of the head part 51, and a groove formed between the outer edge portion 51a and the protrusion 51b.

The protrusion 51b is provided in a vibration-proof member 5B according to the first modification, formed as described above, so that the head part 51 can elastically deform easily when the head part 51 of the vibration-proof member 5B is interposed between the exterior case 3 and the battery holder 22.

Figure 7:
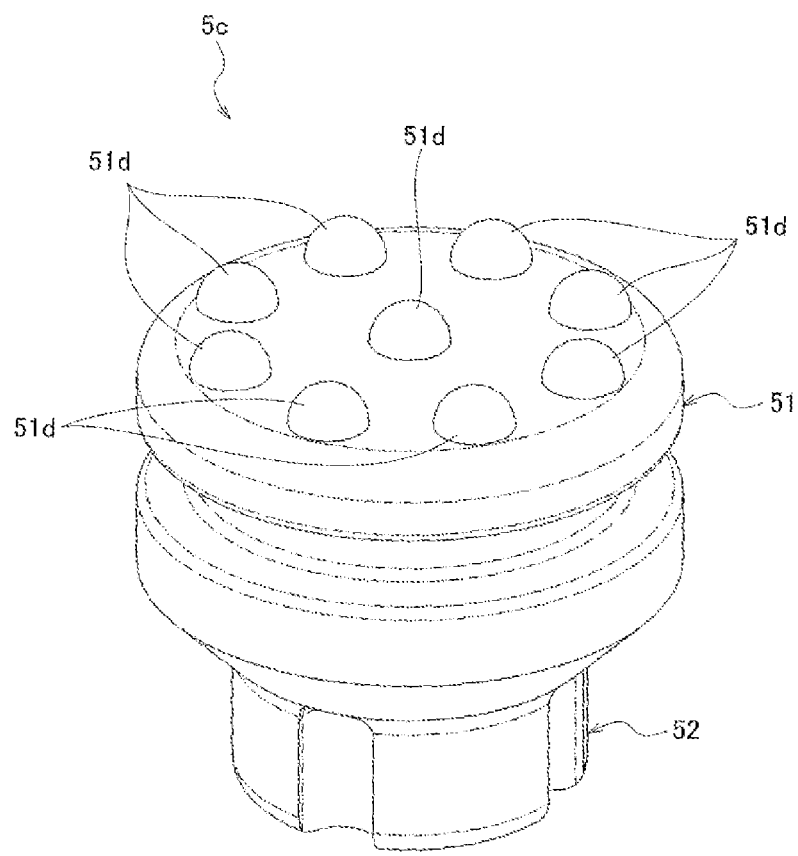
FIG. 7 is a perspective view illustrating a modification of the vibration-proof member provided in the battery pack according to another embodiment of the present technology.

In a modification illustrated in FIG. 7, the head part 51 includes a groove 51c along the circumferential direction of the head part 51, and a plurality of protrusions 51d provided on the top surface to the head part 51. The head part 51 is provided, on its top surface, with a total of nine protrusions 51d. Specifically, the head part 51 is provided, at the center of the top surface, with one protrusion 51d, and eight protrusions 51d are provided, on the top surface in the circumferential direction, at predetermined intervals so as to surround the one protrusion 51d.

The plurality of protrusions 51d are provided in a vibration-proof member 5C according to the second modification, configured as described above, so that a friction force of the vibration-proof member 5C on the exterior case 3 can be reduced to enable reduction in transmission of vibration from the exterior case 3 to the battery block 2. In addition, the groove 51c is provided to allow the head part 51 itself to elastically deform easily. As a result, the head part 51 serves as a cushioning material to enable transmission of vibration to the battery block 2 to be prevented even when vibration is transmitted to the exterior case 3.

Figure 8:
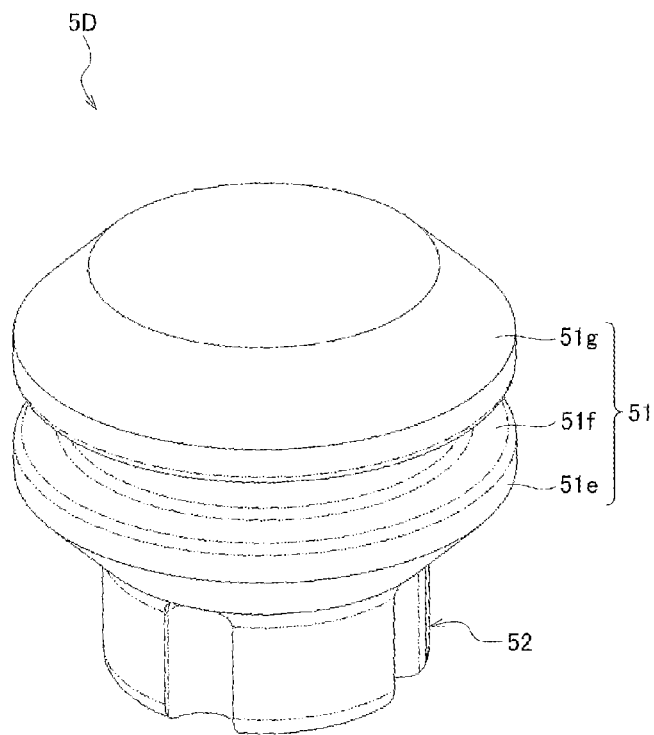
FIG. 8 is a perspective view illustrating a modification of the vibration-proof member provided in the battery pack according to another embodiment of the present technology.

Subsequently, a vibration-proof member 5D according to a modification illustrated in FIG. 8 will be described. In the vibration-proof member 5D, a head part 51 includes a first head part 51e connecting to a shaft part 52, and a second head part 51g connecting to the first head part 51e via the first head part 51e and a groove 51f. The second head part 51g is formed in a substantially truncated conical shape, gradually tapering to a leading end of the head part 51.

The vibration-proof member 5D according to the modification, formed as described above, allows the head part 51 itself to elastically deform easily, similar to the vibration-proof member 5C illustrated in FIG. 7. As a result, the head part 51 serves as a cushioning material to enable transmission of vibration to the battery block 2 to be prevented even when vibration is transmitted to the exterior case 3.

Figure 9:
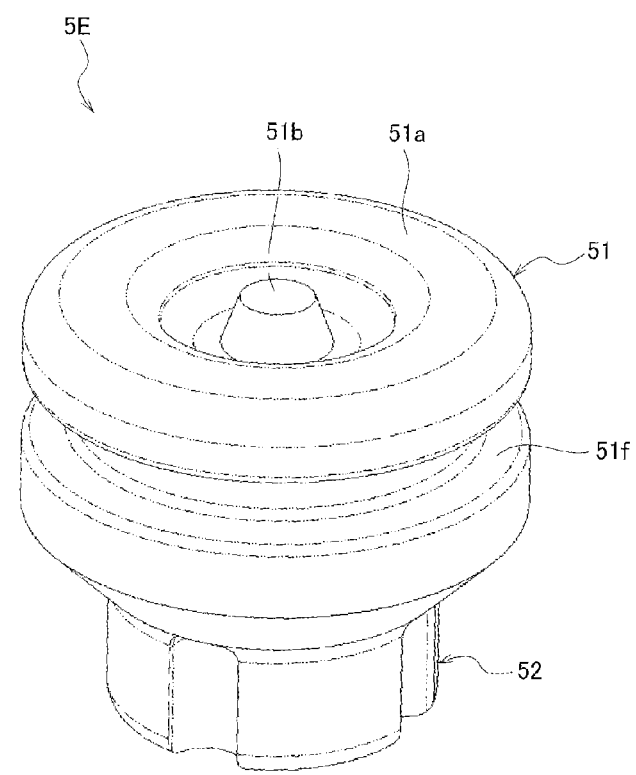
FIG. 9 is a perspective view illustrating a modification of the vibration-proof member provided in the battery pack according to another embodiment of the present technology.

FIG. 9 illustrates a vibration-proof member 5E according to a modification that includes a head part 51 provided with an outer edge portion 51a and a protrusion 51b, similar to the vibration-proof member 5B illustrated in FIG. 6. The head part 51 also includes a groove 51f along the circumferential direction of the head part 51, similar to the vibration-proof member 5C and 5D illustrated in FIGS. 7 and 8, respectively. The vibration-proof member 5E according to this modification also allows the head part 51 itself to elastically deform easily. As a result, the head part 51 serves as a cushioning material to enable transmission of vibration to the battery block 2 to be prevented even when vibration is transmitted to the exterior case 3.

Figure 10:
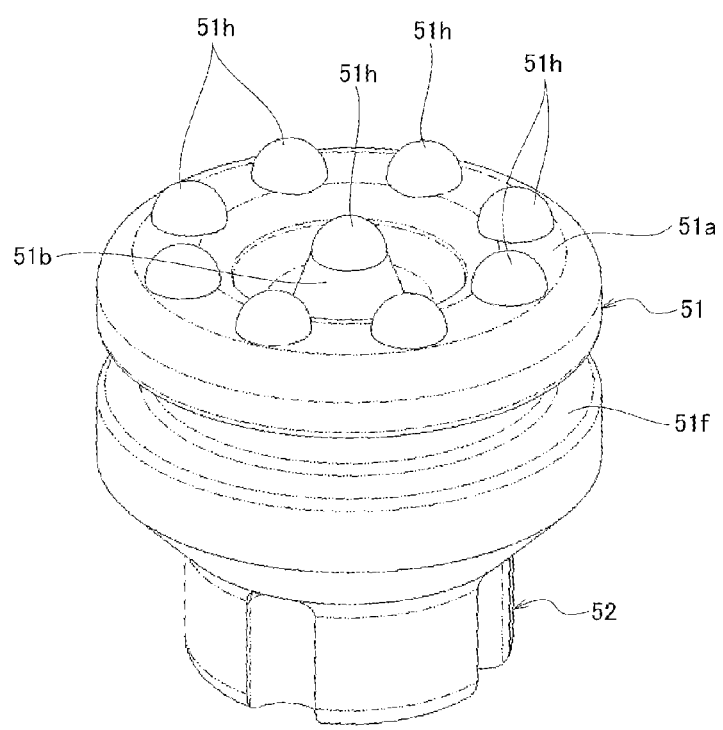
FIG. 10 is a perspective view illustrating a modification of the vibration-proof member provided in the battery pack according to another embodiment of the present technology.

FIG. 10 illustrates a vibration-proof member 5F according to another modification, which is a modification of the vibration-proof member 5E illustrated in FIG. 9. Thus, the same component as that of the vibration-proof member 5E illustrated in FIG. 9 is designated by the same reference numeral to omit description thereof.

The vibration-proof member 5F according to the present modification includes a head part 51 that is provided, on its top surface, with a plurality of protrusions 51h. Specifically, one protrusion 51h is provided on a leading end face of the protrusion 51b, and eight protrusions 51h are provided on a top surface of the outer edge portion 51a along the circumferential direction of the head part 51 at predetermined intervals.

The plurality of protrusions 51h are provided in a vibration-proof member 5F according to the fifth modification, so that a friction force of the vibration-proof member 5F on the exterior case 3 can be reduced to enable reduction in transmission of vibration from the exterior case 3 to the battery block 2. In addition, the head part 51 itself elastically deforms easily, so that the head part 51 serves as a cushioning material to enable transmission of vibration to the battery block 2 to be prevented even when vibration is transmitted to the exterior case 3.

Subsequently, the exterior case 3 provided in the battery pack according to the present technology will be described.

The battery pack 1 illustrated in FIG. 1 is configured such that the exterior case 3 includes a pair of half-exterior cases 31 and 32, and the one half-exterior case 31 and the other half-exterior case 32 are fitted with each other while facing each other. The battery pack 1 illustrated in FIG. 1 is also configured such that the pair of half-exterior cases 31 and 32 are fitted with each other by being fastened with screws 33. A method for fitting the pair of half-exterior cases 31 and 32 with each other is not particularly limited, and a publicly known method is available.

The half-exterior case 31 includes a base plate 31a facing the metal plates 25a fitted into the battery holder 22, and four side-face plates 31b provided perpendicular to the base plate 31a.

Figure 11:
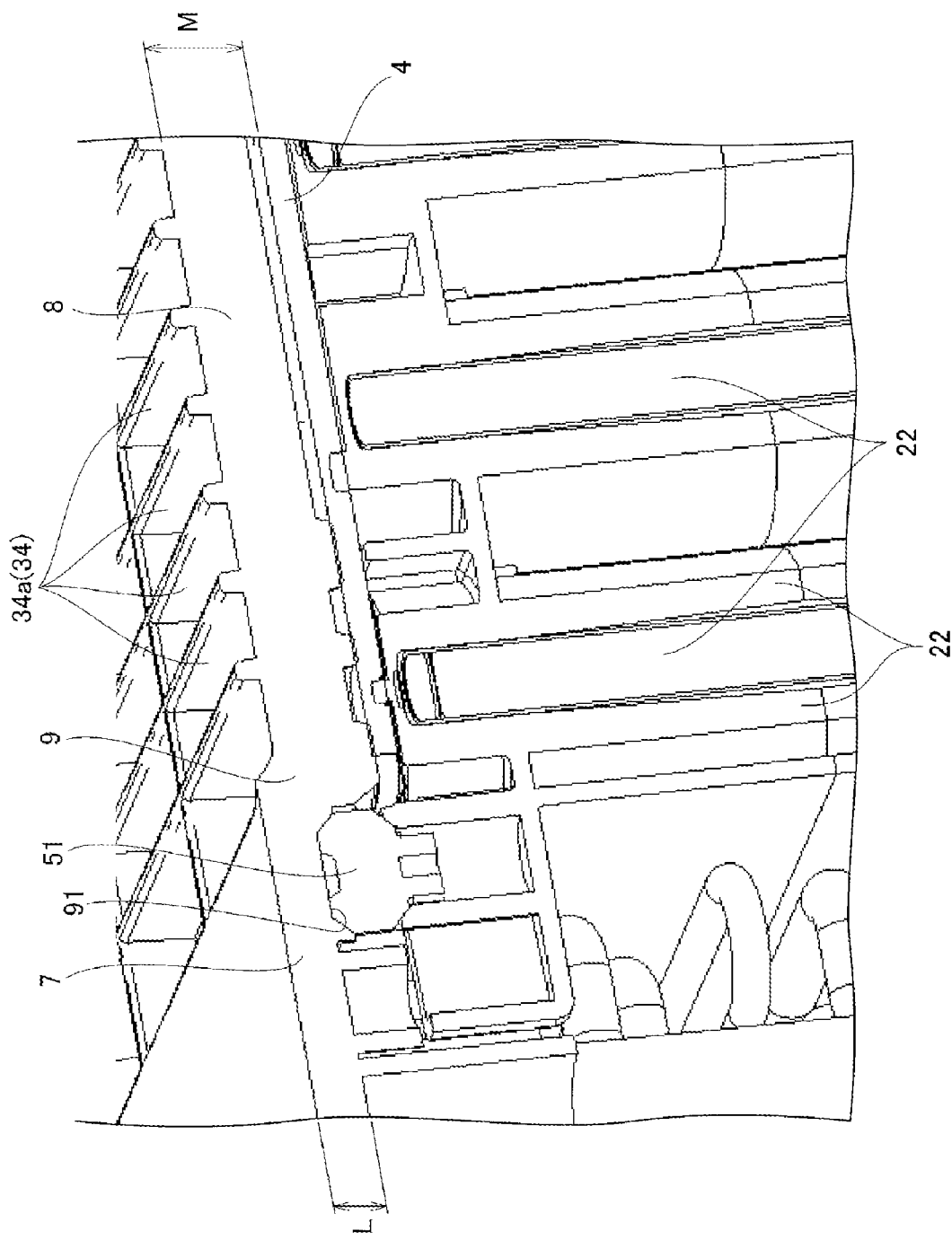
FIG. 11 is a partially enlarged view illustrating a stepped portion provided in the battery pack illustrated in FIG. 1.

As illustrated in FIG. 11, the base plate 31a is formed in a substantially plate-like shape, and includes a pair of first walls 7 each having a plate-like shape with a predetermined thickness, being in close contact with the head part 51 of the vibration-proof member 5, and second walls 8 each having a plate-like shape with a predetermined thickness, being in close contact with the heat conductive member 4, and being disposed between the pair of first walls 7 in the longitudinal direction of the exterior case 3.

The first wall 7 has a thickness L (a length from the outermost surface of the half-exterior case 31 to its surface in contact with the head part 51 of the vibration-proof member 5) that is set within a range of 0.5 to 5.0 mm, preferably within a range of 1.0 to 4.0 mm, and more preferably within a range of 2.0 to 3.0 mm. Meanwhile, the second wall 8 has a thickness M (from its inner surface in close contact with the heat conductive member 4 to its outer surface) that is set within a range of 0.6 to 9.0 mm, preferably within a range of 1.1 to 6.0 mm, and more preferably within a range of 2.1 to 4.0 mm.

The first wall 7 and the second wall 8 are connected via a stepped portion 9 as illustrated in FIG. 11. The first wall 7 is displaced from the second wall 8 in the thickness direction of the base plate 31*a*. Specifically, the second wall 8 is displaced inward from the first wall 7 in the thickness direction of the base plate 31*a*. That is, the second wall 8 defines a recessed portion with respect to a plane including the outermost surface of each of the pair of first walls 7. The stepped portion 9 has an outer surface and an inner surface that incline from the outer surface of the half-exterior case 31 to the inner surface thereof. The stepped portion 9 has a thickness that gradually decreases from the first wall 7 to the second wall 8.

This structure forms a housing space 91 defined by the first wall 7, the stepped portion 9, and the battery holder 22 when the half-exterior case 31 and the battery block 2 are fitted with each other while facing each other. Then, the head part 51 of the vibration-proof member 5 is interposed in the housing space 91. In this state, the top surface of the head part 51 of the vibration-proof member 5 is in close contact with the first wall 7, and the side surface thereof is in close contact with the inner surface of the stepped portion 9.

The second wall 8 is provided in its outer surface with heat-radiating portion 34 for releasing heat generated from the batteries 21.

The heat-radiating portion 34 has a structure in which fins 34*a* each formed in a projecting shape are arranged along the longitudinal direction and the width direction of the battery pack 1 at predetermined intervals, and forms a so-called radiating fin structure. Each of the fins 34*a* vertically projects from the outer surface of the second wall 8, and a leading end face of each of the fins 34*a* is disposed coplanar with the outermost surface of the first wall 7 such that it does not project beyond the outer surface of the first wall 7.

In the battery pack 1 according to the present technology, the heat conductive member 4 is in contact with the inner surface of the second wall 8, so that the heat-radiating portion 34 is disposed so as to overlap with the heat conductive member 4 in the direction perpendicular to the longitudinal direction of the battery pack 1.

The structure of the heat-radiating portion 34 is not limited to the radiating fins described above, and a publicly known structure can be used. Any structure is conceivable, such as a structure with a rotating blade, and a structure in which a metal component excellent in heat conductivity is embedded in the base plate 31*a* by insert molding, as long as heat generated from the batteries 21 can be released to the outside of the battery pack 1.

In the battery pack according to the present technology, the heat-radiating portion 34 is not an essential structure, and may not be provided.

Subsequently, the half-exterior case 32 constituting the exterior case 3 will be described. The half-exterior case 32 does not include the heat-radiating portion 34 unlike the half-exterior case 31, but includes a base plate 32*a* facing the metal plates 25*a* and 25*b*, fitted into the battery holder 22, and four side-face plates 32*b* provided perpendicular to the base plate 32*a*.

Similar to the half-exterior case 31, the half-exterior case 32 includes the base plate 32*a* that is formed in a substantially plate-like shape, a first wall 7 in close contact with the head part 51 of the vibration-proof member 5, and a second wall 8 in close contact with the heat conductive member 4, the first wall 7 and the second wall 8 being connected via a stepped portion 9.

In the half-exterior case 32, the base plate 32*a*, the side-face plates 32*b* other than the side-face plate 32*b* disposed at one end in the longitudinal direction among the side-face plates 32*b*, the first wall 7, the second wall 8, and the stepped portion 9 are identical in structure to the base plate 31*a*, the side-face plates 32*b*, the first wall 7, the second wall 8, and the stepped portion 9 of the half-exterior case 31, respectively, so that description thereof is omitted herein.

Meanwhile, a lead-out hole 35 is formed in the side-face plate (designated by a reference sign "32*bb*" in the drawings, for convenience) disposed at the one end in the longitudinal direction among the side-face plates 32*b* of the half-exterior case 32 (refer to FIG. 2). A grommet 61 is attached to the lead-out hole 35. The harness 6 is inserted into the grommet 61. The harness 6 is inserted into the half-exterior case 32 through the grommet 61, and the leading end of the harness 6 is connected to the metal plates 25*a* and 25*b*.

The half-exterior case 31 and the half-exterior case 32, configured as described above, are fitted with each other while facing each other as described above, and an O-ring 36 is interposed between joining end faces thereof, facing each other. This O-ring 36 is capable of preventing water from entering the inside of the exterior case 3. Thus, the O-ring 36 corresponds to the second waterproof member of the battery pack according to the present technology. The O-ring 36 may include a rubber material such as natural rubber, synthetic natural rubber, silicon, isoprene rubber, butadiene rubber, styrene rubber, styrene butadiene rubber, butyl rubber, ethylene-propylene rubber, nitrile rubber, chlorosulfonated polyethylene rubber, acrylic rubber, urethane rubber, silicone rubber, fluorocarbon rubber, or polysulfide rubber.

The battery pack 1 according to the present technology, configured as described above, includes the stepped portion 9, so that the housing space 91 capable of housing the head part 51 of the vibration-proof member 5 can be formed, and clearance volume between the metal plates 25*a* and 25*b* and the second wall 8 can be reduced as much as possible.

As a result, both of the vibration-proof structure by the vibration-proof member 5 and the heat-radiating structure by the heat conductive member 4 can be achieved. This makes it possible to prevent performance deterioration of each of the batteries 21 due to heat generation of each of the batteries 21 and vibration transmitted to the battery block 2.

In addition, each of the vibration-proof members 5 is positioned in the battery holder 22 and fixed thereto, and the head part 51 of each of the vibration-proof members 5 is in close contact with the inner surface of the first wall 7 and the inner surface of the stepped portion 9.

Thus, even under use environment where the battery pack 1 is used in a vehicle mounting an electric motor as a driving source to cause vibration of the driving source to be transmitted to the battery pack 1, the vibration-proof member 5, particularly the head part 51, serves as a cushioning material to be able to prevent the vibration from being transmitted to the battery block 2, and to the batteries 21, while the vibration is transmitted to the exterior case 3.

Then, the heat conductive member 4 to be disposed between the metal plates 25*a* and 25*b*, and the second wall 8, can be reduced in thickness as much as possible to enable heat generated from each of the batteries 21 to be efficiently released to the outside.

The battery pack 1 according to the present technology also includes the heat-radiating portion 34 provided in the outer surface of the second wall 8, and the heat-radiating portion 34 is disposed so as to overlap with the heat conductive member 4 in the direction perpendicular to the longitudinal direction of the battery pack 1. In addition, no air layer is provided among the second wall 8 of the exterior case 3, the heat conductive member 4, the metal plates 25a and 25b, and an electrode of each of the batteries 21. This structure causes heat generated from each of the batteries 21 to be efficiently transmitted through the metal plates 25a and 25b, the heat conductive member 4, the second wall 8, and the heat-radiating portion 34 in this order to be released to the outside.

The battery pack 1 according to the present technology also includes the stepped portion 9 to cause the second wall 8 to be displaced inward from the first wall 7, so that it is possible to provide the heat-radiating portion 34 that does not project beyond the outermost surface of the exterior case 3. As a result, a space where the battery pack 1 is to be housed can be prevented from being complicated in shape.

In the battery pack 1 according to the present technology, the O-ring 36 is provided between the half-exterior case 31 and the half-exterior case 32, so that the inside of the exterior case 3 can be hermetically sealed. This enables not only a high heat-radiating function by the heat-radiating structure but also waterproof structure to be secured. In addition, since the waterproof part 24 is provided, entry of water between the battery holder 22 and each of the batteries 21 can be prevented even if water enters the inside of the exterior case 3. This makes it possible to prevent performance deterioration of each of the batteries 21 due to entry of water.

Figure 12:
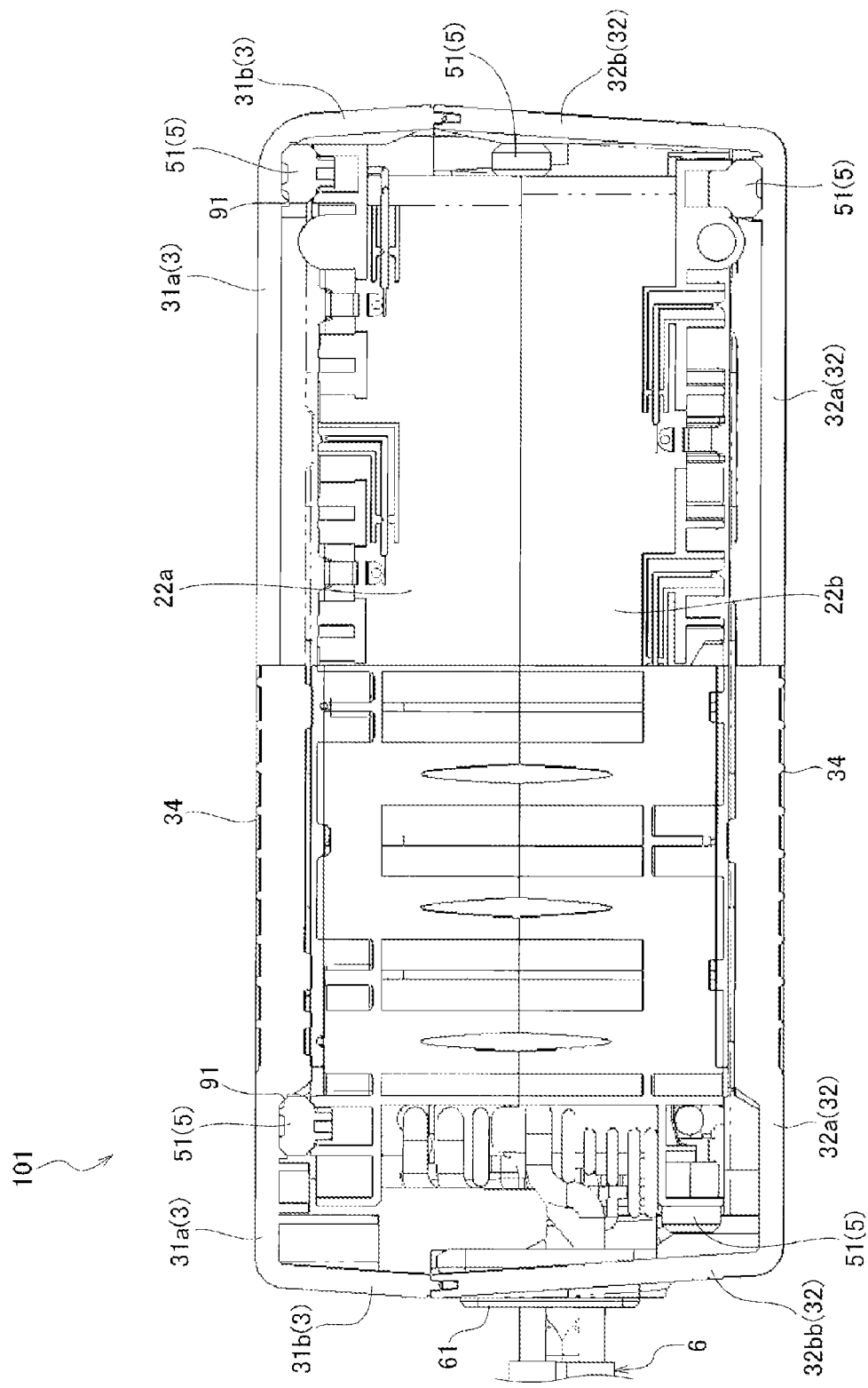
FIG. 12 is a partly-sectioned view of a battery pack according to another embodiment of the present technology.

Another embodiment of the battery pack according to the present technology will be described with reference to FIG. 12. A battery pack 101 according to this embodiment has the same structure as the battery pack 1 according to the embodiment previously described herein except that the half-exterior case 32 includes the heat-radiating portion 34. Thus, the structure other than the common structure is designated by the same reference numeral to omit description thereof.

The battery pack 101 according to the embodiment includes the exterior case 3 provided with two heat-radiating portions 34. In other words, the heat-radiating portion 34 is formed also in an outer surface of a second wall 8 of the half-exterior case 32 in the battery pack 101 illustrated in FIG. 12. The battery pack 101 includes heat conductive members 4 each of which is disposed so as to overlap with the corresponding one of the heat-radiating portions 34 in a direction perpendicular to the longitudinal direction of the battery pack 101.

This structure enables heat generated from each of the batteries 21 to be more efficiently released to the outside of the exterior case 3, so that it is possible to prevent performance deterioration of each of the batteries 21 due to heat generation by the batteries 21 as much as possible.

In the battery pack according to the present technology, while the battery pack 1 according to an embodiment and the battery pack 101 according to another embodiment each include the heat-radiating portion 34 formed in the outer surface of the second wall 8, or the surface perpendicular to the longitudinal direction of the battery pack, the heat-radiating portion 34 may be provided in at least one of opposite end surfaces of the exterior case 3 in its longitudinal direction, or in at least one of opposite end surfaces of the exterior case 3 in its width direction, for example. In other words, the heat-radiating portion 34 may be formed in any one of the side-face plates 31b and 32b of the corresponding half-exterior cases 31 and 32.

The present technology is described below in further detail according to an embodiment:

(1)
A battery pack including: a battery block including batteries and a battery holder; an exterior case in which the battery block is housed; a heat conductive member interposed between an inner surface of the exterior case and at least one of electrodes of each of the batteries; and a vibration-proof member interposed between an inner surface of the exterior case and the battery holder, the vibration-proof member being thicker than the heat conductive member.

(2)
The battery pack according to aspect (1), wherein the exterior case includes a first wall facing the vibration-proof member, a second wall facing the heat conductive member, and a stepped portion connecting the first wall and the second wall.

(3)
The battery pack according to aspect (2), wherein the vibration-proof member is provided in a housing space defined by the stepped portion.

(4)
The battery pack according to any one of aspects (1) to (3), further including a heat-radiating portion in the second wall.

(5)
The battery pack according to any one of aspects (1) to (4), further including a waterproof part for covering an electrode of each of the batteries.

(6)
The battery pack according to any one of aspects (1) to (5), wherein the vibration-proof member is formed of a rubber vibration insulator.

(7)
The battery pack according to any one of aspects (1) to (6), wherein the vibration-proof member is formed of ethylene propylene diene rubber.

(8)
The battery pack according to any one of aspects (1) to (7), wherein the heat conductive member is formed of inorganic-filler-containing silicon resin.

(9)
The battery pack according to any one of aspects (4) to (8), wherein the heat-radiating portion is a radiating fin provided on an outer surface of the second wall, the radiating fin being formed in a projecting shape.

(10)
The battery pack according to aspect (9), wherein a leading end face of the first wall and a leading end face of the radiating fin are disposed coplanar with each other.

(11)
The battery pack according to any one of aspects (1) to (10), wherein electrode tabs of the corresponding batteries are connected to each other; the heat conductive member is interposed between the electrode tabs and the second wall; and an electrode of each of the batteries, the electrode tabs, the heat conductive member, and the second wall are in close contact with each other.

(12)
The battery pack according to any one of aspects (1) to (11), wherein the exterior case includes a pair of half-exterior cases, and the pair of half-exterior cases is joined to each other with a second waterproof part interposed between the half-exterior cases.

(13)

The battery pack according to any one of aspects (1) to (12), wherein the vibration-proof member includes a head part, and a shaft part extending from the head part.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A battery pack comprising:
    a battery block including a plurality of batteries and a battery holder;
    an exterior case configured to house the battery block;
    a heat conductive member interposed between a first inner surface of the exterior case and at least one of electrodes of the batteries; and
    a vibration-proof member interposed between a second inner surface of the exterior case and the battery holder;
    wherein the vibration-proof member includes a head part, and a shaft part extending from the head part;
    wherein the battery holder includes an insertion hole member,
    wherein the shaft part of the vibration-proof member is inserted into the hole member,
    wherein the head part of the vibration-proof member is thicker than the heat conductive member,
    wherein the exterior case includes a first wall contacting the vibration-proof member and a second wall contacting the heat conductive member, and
    wherein the second wall is displaced inward from the first wall and is parallel to the first wall, and wherein the second wall is thicker than the first wall.

2. The battery pack according to claim 1, wherein a stepped portion connects the first wall and the second wall.

3. The battery pack according to claim 2, wherein the vibration-proof member is provided in a housing space defined by the stepped portion.

4. The battery pack according to claim 2, further comprising a heat-radiating portion.

5. The battery pack according to claim 4, wherein the heat-radiating portion includes a radiating fin provided on an outer surface of the second wall, and wherein the radiating fin includes a projecting shape.

6. The battery pack according to claim 5, wherein a leading end face of the first wall and a leading end face of the radiating fin are disposed in a same plane.

7. The battery pack according to claim 2, further comprising a first waterproof member configured to cover at least an electrode of the batteries.

8. The battery pack according to claim 2, wherein
    electrode tabs of the batteries are connected to each other,
    the heat conductive member is interposed between the electrode tabs and the second wall, and
    at least an electrode of the batteries, the electrode tabs, the heat conductive member, and the second wall are in contact with each other.

9. The battery pack according to claim 1, wherein the vibration-proof member includes a rubber vibration insulator.

10. The battery pack according to claim 9, wherein the vibration-proof member includes an ethylene propylene diene rubber.

11. The battery pack according to claim 1, wherein the heat conductive member includes an inorganic-filler-containing silicon resin.

12. The battery pack according to claim 1, wherein
    the exterior case includes a pair of half-exterior cases, and
    the pair of half-exterior cases are joined to each other with a second waterproof member interposed between the half-exterior cases.

13. The battery pack according to claim 1, wherein the vibration-proof member is thicker than the heat conductive member.

* * * * *